United States Patent
Stewart et al.

(10) Patent No.: US 7,590,791 B2
(45) Date of Patent: *Sep. 15, 2009

(54) OPTIMIZED SWITCHING METHOD

(75) Inventors: Heath Stewart, Santa Barbara, CA (US); Chris Haywood, Thousand Oaks, CA (US); Michael De La Garrigue, Agoura Hills, CA (US); Nadim Shaikli, San Diego, CA (US); Ken Wong, San Diego, CA (US); Bao Vuong, San Diego, CA (US); Thomas Reiner, Carlsbad, CA (US); Adam Rappoport, Agoura Hills, CA (US)

(73) Assignee: Topside Research, LLC, Williamsburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/196,025

(22) Filed: Aug. 21, 2008

(65) Prior Publication Data

US 2008/0307150 A1    Dec. 11, 2008

Related U.S. Application Data

(62) Division of application No. 11/031,420, filed on Jan. 7, 2005, now Pat. No. 7,426,602.

(60) Provisional application No. 60/534,903, filed on Jan. 8, 2004.

(51) Int. Cl.
   *G06F 13/14*    (2006.01)
   *G06F 3/00*    (2006.01)
(52) U.S. Cl. ......................... 710/317; 710/29
(58) Field of Classification Search ......... 710/316–317, 710/29, 31, 52, 104, 105
   See application file for complete search history.

(56) References Cited

U.S. PATENT DOCUMENTS

| | | | |
|---|---|---|---|
| 4,330,824 A | 5/1982 | Girard | |
| 4,394,725 A | 7/1983 | Bienvenu et al. | |
| 4,704,606 A | 11/1987 | Hasley | |
| 4,958,299 A | 9/1990 | Akada | |
| 5,550,823 A | 8/1996 | Irie et al. | |
| 5,555,543 A | 9/1996 | Grohoski | |
| 5,649,149 A | 7/1997 | Stormon et al. | |
| 5,659,713 A | 8/1997 | Goodwin et al. | |
| 5,841,874 A | 11/1998 | Kempke et al. | |
| 5,860,085 A | 1/1999 | Stormon et al. | |
| 5,898,689 A | 4/1999 | Kumar et al. | |

(Continued)

OTHER PUBLICATIONS

Bhatt, Creating A Third Generation I/O Interconnect, White Paper, 2002, pp. 1-8, Technology and Research Labs, Intel Corporation, available at: http://www.intel.com/technology/pciexpress/downloads/3rdgenwhitepaper.pdf.

(Continued)

*Primary Examiner*—Thomas J. Cleary
*Assistant Examiner*—Trisha Vu
(74) *Attorney, Agent, or Firm*—SoCal IP Law Group LLP; Steven C. Sereboff; John E. Gunther

(57) ABSTRACT

There is disclosed a bus optimization technique. Pursuant to the bus optimization technique, the output buffer and output logic are removed from port units of a switch and are included with a control matrix in the switch. Data units received in a first port unit of a plurality of port units are provided to a control matrix. The control matrix evaluates when to send the data unit to a second port unit. No output decisions are made in the second port unit.

10 Claims, 5 Drawing Sheets

U.S. PATENT DOCUMENTS

| | | | |
|---|---|---|---|
| 5,905,911 | A | 5/1999 | Shimizu |
| 5,923,893 | A | 7/1999 | Moyer et al. |
| 5,961,626 | A | 10/1999 | Harrison et al. |
| 5,982,749 | A | 11/1999 | Daniel et al. |
| 6,067,408 | A | 5/2000 | Runaldue et al. |
| 6,122,674 | A | 9/2000 | Olnowich |
| 6,172,927 | B1 | 1/2001 | Taylor |
| 6,172,963 | B1 | 1/2001 | Larsson |
| 6,185,222 | B1 | 2/2001 | Hughes |
| 6,292,878 | B1 | 9/2001 | Morioka et al. |
| 6,346,946 | B1 | 2/2002 | Jeddeloh |
| 6,389,489 | B1 | 5/2002 | Stone |
| 6,442,674 | B1 | 8/2002 | Lee et al. |
| 6,460,120 | B1 | 10/2002 | Bass et al. |
| 6,477,623 | B2 | 11/2002 | Jeddeloh |
| 6,493,347 | B2 | 12/2002 | Sindhu et al. |
| 6,510,138 | B1 | 1/2003 | Pannell |
| 6,557,053 | B1 | 4/2003 | Bass et al. |
| 6,574,194 | B1 | 6/2003 | Sun et al. |
| 6,611,527 | B1 | 8/2003 | Moriwaki et al. |
| 6,693,456 | B2 | 2/2004 | Wong |
| 6,708,262 | B2 | 3/2004 | Manning |
| 6,714,555 | B1 | 3/2004 | Excell et al. |
| 6,735,219 | B1 | 5/2004 | Clauberg |
| 6,760,793 | B2 | 7/2004 | Kelley |
| 6,795,870 | B1 | 9/2004 | Bass et al. |
| 6,842,443 | B2 | 1/2005 | Allen, Jr. et al. |
| 6,987,760 | B2 | 1/2006 | Calvignac et al. |
| 7,096,305 | B2 | 8/2006 | Moll |
| 7,426,602 | B2 * | 9/2008 | Stewart et al. ............ 710/317 |
| 2001/0037435 | A1 | 11/2001 | Van Doren |
| 2002/0165947 | A1 | 11/2002 | Akerman et al. |
| 2004/0019729 | A1 | 1/2004 | Kelley |
| 2004/0030857 | A1 | 2/2004 | Krakirian et al. |

OTHER PUBLICATIONS

Fahmy, A Survey of ATM Switching Techniques, Aug. 14, 2001, Department of Computer and Information Science, The Ohio State University.

Gupta, Scheduling in Input Queued Switches: A Survey, Jun. 1996, Department of Computer Science, Stanford University, California.

Intel, Improve Video Quality with the PCI Express x16 Graphics Interface; Sales Brief, 2004, pp. 1-2; Intel Corporation, available at: http://www.intel.com/design/chipsets/pciexpress.pdf.

Klein, PCI Express Is the new I/O Solution of Choice, Article, Nov. 2004, pp. 1-5, Technology @ Intel Magazine, Intel Corporation.

PCI Express Base Specification, Revision 1.0a, Apr. 15, 2003, pp. 27, 28, 33, 34, 101, 280.

Petaswitch Solutions, Inc., Company Overview, 2001, available at: http://www.peta-switch.coin/markets/overview.htm.

Petaswitch Solutions, Inc., PetaSwitch Solutions Announces Raising $4 Million in First Round Financing, Press Reiease, 2001, available at http://peta-switch.com/newsroom/press_releases.htm.

Petaswitch Solutions, Inc., The Pisces Chipset, Product Brief, 2001, available at: http://www.peta-switch.com/products/product_brief.htm.

Schoenen, et al., Distributed Cell Scheduling Algorithms for Virtual-Output Queued Switches, Dec. 1999, pp. 1211-1215, vol. 1, GLOBECOM, IEEE Global Telecommunications Conference.

Stam, Inside PCI Express, Article, Sep. 9, 2002, pp. 1-14, ExtremeTech, available at: http://www.extremetech.com/article2/0,3973,522663,00.asp.

Stiliadis, et al., Rate-Proportional Servers: A Design Methodology for Fair Queueing Algorithms, Dec. 1995, Computer Engineering & Information Sciences, University of California, Santa Cruz.

Stoica, et al., Earliest Eligible Virtual Deadline First: A Flexible and Accurate Mechanism for Proportional Share Resource Allocation, Department of Computer Science, Old Dominion University, Norfolk, VA.

* cited by examiner (c) 2008 Topside Research

OPTIMIZED SWITCHING METHOD

RELATED APPLICATION INFORMATION

This patent application is a division of U.S. patent application Ser. No. 11/031,420, filed Jan. 7, 2005, now U.S. Pat. No. 7,426,602 B2, which in turn claims the benefit of U.S. Provisional Application No. 60/534,903 filed Jan. 8, 2004, both of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The invention relates to intra-computer communications, to inter-device communications, and to buses.

2. Description of the Related Art

Buses provide an electrical, physical and logical interconnection for multiple peripheral devices of microprocessor based systems. Some bus systems are governed by protocols that align components in an hierarchical tree. Examples of such buses include the Peripheral Component Interconnect (PCI) bus, PCI-X (that is, PCI extended) bus, and the PCI-Express bus. The devices in the tree hierarchy typically communicate with the host processor and often times with each other. Devices may be separated on the tree by bridges and each bridge may communicate with the devices attached to it on a unique logical bus. Each bus within the tree may be assigned a unique number.

The tree structure and the bridges are bound by protocol rules that identify and process transactions on the bus. In the PCI protocol, transactions are classified as posted, non-posted and completions. Specific rules, commonly referred to as ordering rules, apply to the way the three transaction classes are passed through the bridge. Adherence to the ordering rules is required to guarantee system behavior.

DETAILED DESCRIPTION OF THE INVENTION

Throughout this description, the embodiments and examples shown should be considered as exemplars, rather than limitations on the apparatus and methods of the invention.

A System

Figure 1:
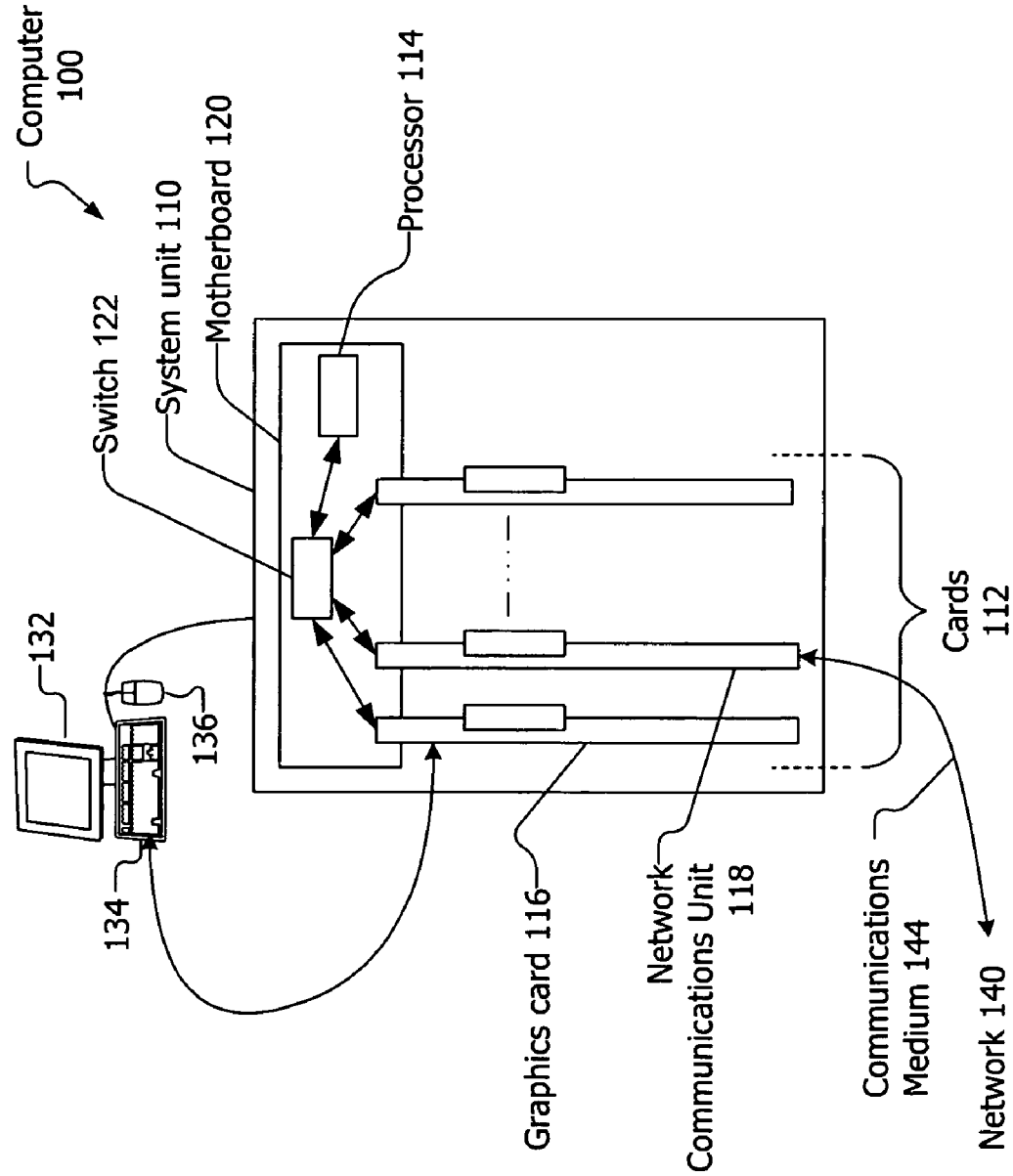
FIG. 1 is a block drawing of a computer in which the invention described herein may be practiced.

FIG. 1 is a block drawing of a computer 100 in which the invention described herein may be practiced. The bus optimization technique described herein may be included in a personal computer or other computing device, such as, for example, computer 100. A computing device as used herein refers to any device with a processor, memory and a storage device that may execute instructions including, but not limited to, personal computers, server computers, server blades, computer workstations, computing tablets, set top boxes, video game systems, personal video recorders, telephones, personal digital assistants (PDAs), portable computers, and laptop computers. These computing devices may run an operating system, including, for example, the Linux, Unix, MS-DOS, Microsoft Windows, Palm OS, and Apple Mac OS X operating systems.

Computer 100 is shown with a system unit 100 having a motherboard 120 included therein. The motherboard 120 typically includes a processor 114 or microprocessor such as an Intel Pentium, or other processor. Other chips included in a "chip set" may also be included on the motherboard 120. The motherboard 120 may have certain controllers and other chips included thereon. The motherboard 120 may also include memory such as random access memory included thereon.

The motherboard 120 may have multiple bus connectors included thereon. The bus connectors may be, for example, one or more of each of Industry Standard Architecture (ISA), Accelerated Graphics Port (AGP), Peripheral Component Interconnect (PCI), PCI Express, and/or other bus connectors. The motherboard 120 may have one or more chips included thereon that provide support for one or more of the buses. One of these chips may contain a switch 122 conforming to a bus specification in which the techniques described herein may be implemented. The switch 122 may have two or more ports connected to devices within the computer 100.

One or more cards 112 or boards may be coupled with the motherboard 120 via the bus connectors. Each of the cards 112 may be peripheral devices, provide access to peripheral devices, provide communications support, or otherwise extend the functionality of the computer 100. The bus on motherboard 120 allows for each of the cards 112 and devices included thereon or coupled thereto to communicate with and share information with one another.

A card 112 may be provided that may be a graphics controller card having a graphics processor and dedicated graphics memory included thereon, such as graphics card 116. In another embodiment, the motherboard 120 may have one or more chips that provide support for the display of text and graphics, such as, for example, a graphics processor.

A card 112 may be provided that may be known as a sound card having an audio processing and/or synthesizing chip included thereon and may support 3D audio, surround sound, and other audio techniques. In another embodiment, the motherboard 120 may have one or more chips that provide support for audio.

One or more separate cards may include chips that provide support for network and other communications, such as, for example, Ethernet and Synchronous Optical Network (Sonet), IEEE 1394 (also known as FIREWIRE® and I.LINK®), Universal Serial Bus (USB), Bluetooth, IEEE 802.11, WiFi, ZigBee, and others. The card may be a network communications unit, such as network communications unit 118 which allows for communication with network 140 over communications medium 144. The network communications unit 118 may be a network interface card (NIC). In another embodiment, the motherboard 120 also have chips that provide support for various communications.

Other cards 112 may provide support for cable modems, DSL modems, dial-up modems, and/or other communications. Other cards 112 may provide support for digital video editing/video capture, may be a disk drive controller, may be a voice synthesis card, may be an encryption processing card, and may provide support for or be other computer peripheral devices. In other embodiments, this functionality may be included in chips on motherboard 120.

The computer 100 may have a display screen 132 couple thereto or included therewith. The computer 100 may have one or more user input devices coupled thereto or included therewith, including, a keyboard 134, a mouse 136, a keypad, a joystick, a touchpad, a pointing device, and others. The user input devices may be coupled with the system unit via wired or wireless connections, such as, for example, Bluetooth and USB, among others.

Additional and fewer components and arrangement of hardware may be included in a computing device such as computer 100. In addition, multiple instances of the components shown and discussed may be included in computer 100 or other computing device.

Bus Switches

Figure 2:
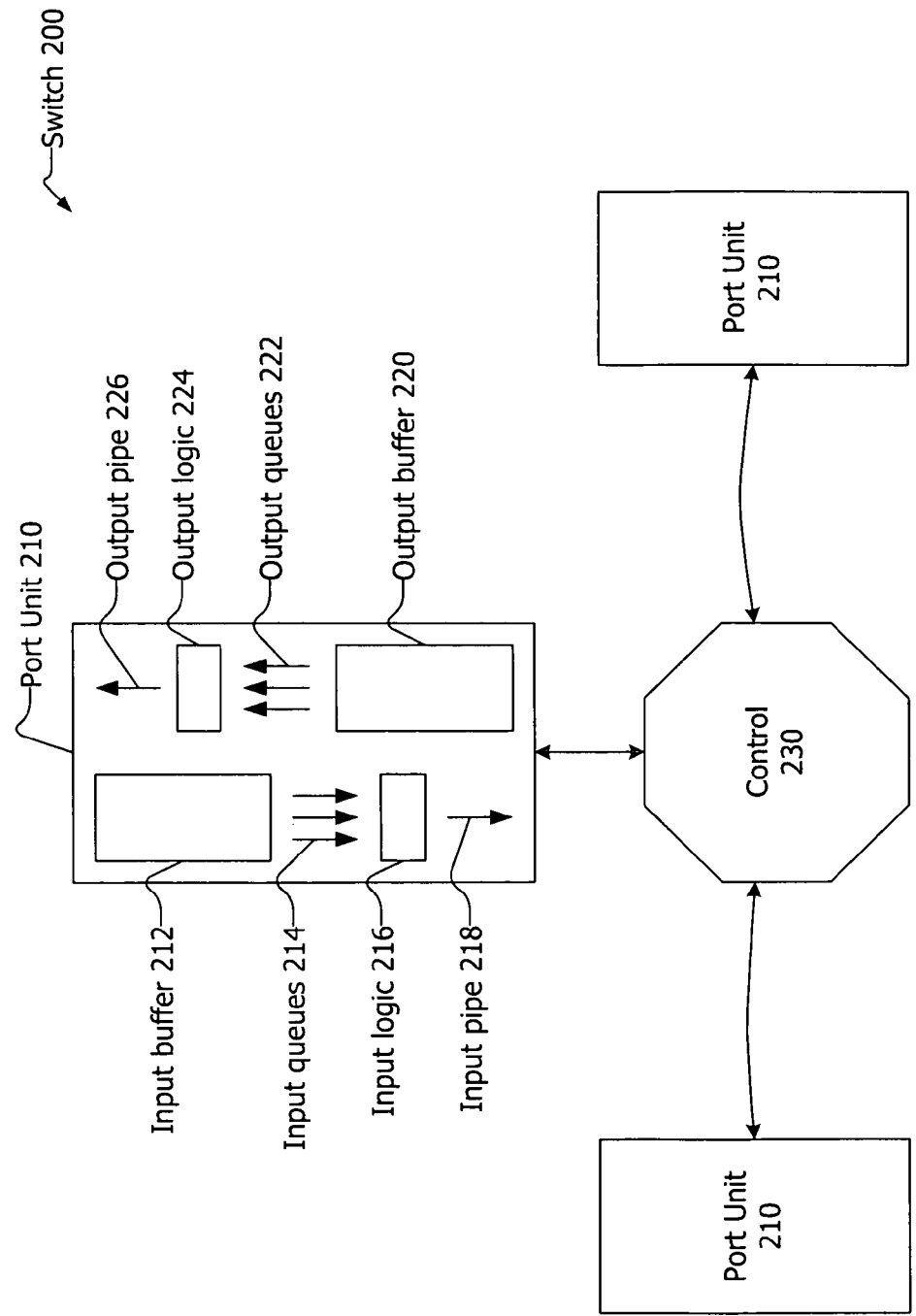
FIG. 2 is a block drawing of a switch unit.

FIG. 2 is a block diagram of a switch unit 200. The switch 200 may have multiple port units 210 that connect to devices (as shown in FIG. 1) to enable the devices to communicate with one another. The devices include one or more processors, motherboards, buses, peripheral devices, cards as described above, and the like.

The communication between port units 210 pass through control logic 230. The communications are in the form of units of data referred to herein as data units. Data units as used herein refer to any grouping of data according conforming to a protocol, including packets. In one embodiment, the packets conform to the PCI Express protocol. The data units may include one or more headers and one or more bodies or payloads.

Each of the port units 210 include an incoming or ingress path and an outgoing or egress path. The ingress path includes an input buffer 212 to receive and store incoming data units. The data units proceed from input buffer 212 to input queues 214. Three input queues 214 are shown representing posted, non-posted and completion transactions. The data units pass from the input queues 214 to the input logic 216, and then to a single input pipe 218.

The input logic 216 evaluates the sequence or order that data units from input queues 214 are to be provided to input pipe 218 and passed control 230. The sequencing or order is based on rules promulgated by a particular bus specification, such as, for example, PCI Express. Incoming data units leave the port units 210 through the input pipe 218.

Outgoing data units are received from control logic 230 in output buffer 220 and stored. In an implementation according to the PCI Express specification, each of the outgoing data units are placed in one of three output queues 222 according to their transaction type, namely, posted, non-posted, and completion. The outgoing data units exit the port unit 210 according to output logic 224. The output logic evaluates the sequence or order that data units from output queues 222 are to be provided to output pipe 226 and passed to a device coupled to the port unit 210. The sequencing or order is based on rules promulgated by a particular bus specification, such as, for example, PCI Express.

More generally, packets entering the switch 200 device are placed in the input buffer 212 pending selection by the reordering algorithm implemented in input logic 216. Successful attempts to reach the target port unit culminate in the packet being transferred from the input buffer 212 of an ingress port unit 210 to the target output buffer 220 on a destination or egress port unit 210. Upon reaching the output buffer 220, packets are queued until sufficient flow control credits are accumulated and reordering rules are met to qualify the packet for transmission according to the output logic 224.

The switch 200 may be implemented on an application specific integrated circuit (ASIC), a programmable logic device (PLD), a field programmable gate array (FPGA), and other devices.

The switch 200 and the description thereof above is constructed so that PCI Express ordering rules and the internal virtual PCI-to-PCI bridge model for PCI compatibility is maintained. However, the path through the switch 200 from an ingress port unit 210 to an egress port unit 210, is two hops requiring passing through two sets of buffers, an input buffer 212 and an output buffer 220, and two sets of reordering functions, in the input logic 216 and the output logic 224, to maintain ordering rules. This arrangement can be expensive both in terms of silicon area and in transaction latency through the switch 200. That is, the time to pass through the switch negatively impacts performance of the switch 200, and the amount of a chip space required to implement the switch 200 reduces the amount of chip space that could be used for other things and/or prevents the implementation on a simpler, less costly (in monetary terms) chip.

Figure 3:
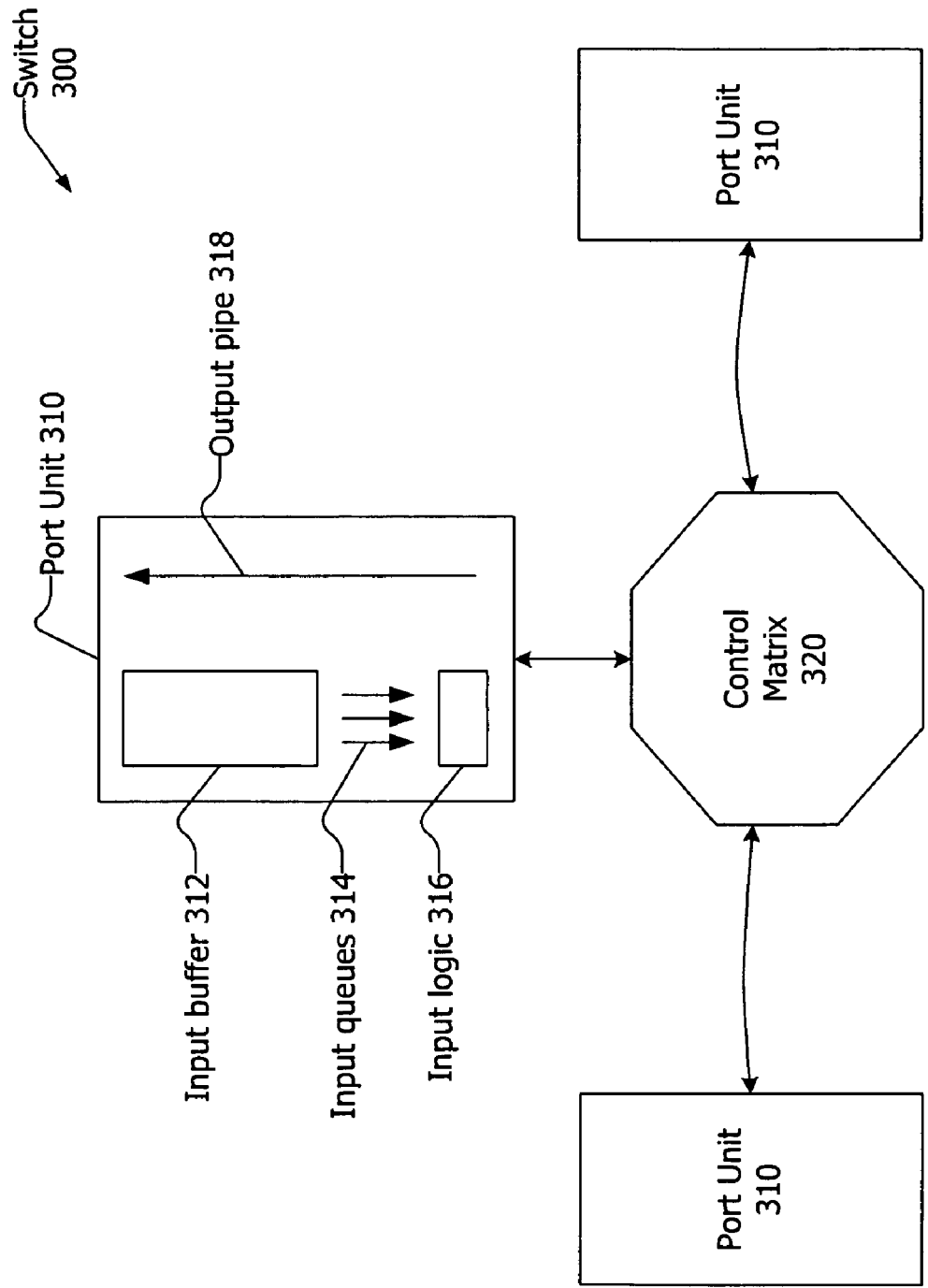
FIG. 3 is a block diagram of a switch unit having components arranged according to the invention described herein.

FIG. 3 is a block diagram of a switch unit 300 having components arranged according to the invention described herein. Switch unit 300 is designed to reduce path latency, design complexity and buffer cost while adhering to the PCI Express specification. When compared to switch unit 200, decisions may be gathered and streamlined to collapse the switch structure as shown in FIG. 2. By using the single, interlaced control matrix 320, the need for the output buffer 220 from switch 200 of FIG. 2 is no longer required.

Switch 300 may be considered to be an optimized implementation of switch 200 shown in FIG. 2. In switch 300, ingress and egress reordering functions are allowed to jointly select a packet and place it directly in the outgoing data path. Although the switch 300 adheres to separate and distinct ingress and egress reordering functions specified by the PCI Express protocol, these functions are collapsed to a single, interlaced control matrix 320. The control matrix 320 may include egress flow control gating, port arbitration, deadlock avoidance rules, and virtual channel arbitration of the PCI Express protocol. The architecture of the switch 300 maintains PCI express reordering rules even though it effectively eliminates the virtual PCI-to-PCI bridge model.

The switch 300 may have multiple port units 310 that allow devices (not shown) to communicate with one another. The devices (not shown) may be computer peripheral cards and devices such as hard disk drives, video display adapters (also known as graphics cards), communications cards such as, for example, modems and network interface cards, motherboards, processors, buses, and others. The communication between port units 310 pass through control matrix 320. The communications are in the form of data units. Although three port units 310 are shown, additional port units may be included in switch 300.

Each of the port units 310 include an incoming or ingress path and an outgoing or egress path. The ingress path includes an input buffer 312, input queues 314, input logic 316 and control matrix 320. The input buffer 312 receives incoming data units. The data units proceed from input buffer 312 to input queues 314. Three input queues 314 are shown representing posted, non-posted and completion transactions. The data units pass from the input queues 314 to the input logic 316. Incoming data units leave the port units 310 according to the input logic 316 and control matrix 320.

The egress path includes control matrix 320 and output pipe 318. Outgoing data units are received from control matrix 320 in output pipe 318. The output logic and other processing included in each of port units 210 is included instead in control matrix 320. Control matrix 320 evaluates the sequence or order that outgoing data units are provided to output pipe 318 and passed to a device coupled to the port unit 310. The output pipe 318 may operate in a first-in-first-out (FIFO) manner. Data units in pipe 318 may not be reordered. The sequencing or order evaluated by the control matrix 320 is based on rules promulgated by a particular bus specification, such as, for example, PCI Express. The evaluation includes arbitration, prioritization, reordering, contention management, and other related functions.

In comparison to the switch 200 shown in FIG. 2, the output decision logic is distributed and remapped to both the control matrix 320 and the input decision logic 316 of the ports of the switch 300. That is, the output logic 224 of port unit 210 shown in FIG. 2 is distributed and placed in the control matrix 320 and input logic 316. In addition, some of the information that was formerly available only to the input decision logic in input logic 216 of port unit 210 shown in FIG. 2 is made available by input logic 316 to the central control matrix 320 shown in FIG. 3. The input logic 316 and the control matrix 320 perform the port transmission selection in a single step process. By integrating the output decision logic (see output logic 224 of port unit 210 shown in FIG. 2) into the control matrix 320, the control matrix 320 performs a look ahead function that is applied to the selection process of the input logic 316.

By removing the output logic and related output queues from each of the port units 310 and placing the functionality in control matrix 320, the amount of overhead in the form of circuitry and processing is reduced when compared to switch 200 and other implementations. The reduction in circuitry results in increased performance in the form of increased throughput, reduced latency, and more responsive communications. Faster bus performance is the end result. In addition, manufacturing costs are reduced due to the reduced amount of buffer space and/or number of buffers needed.

The switch 300 may be implemented on an ASIC, a PLD, an FPGA, and other devices.

Figure 4:
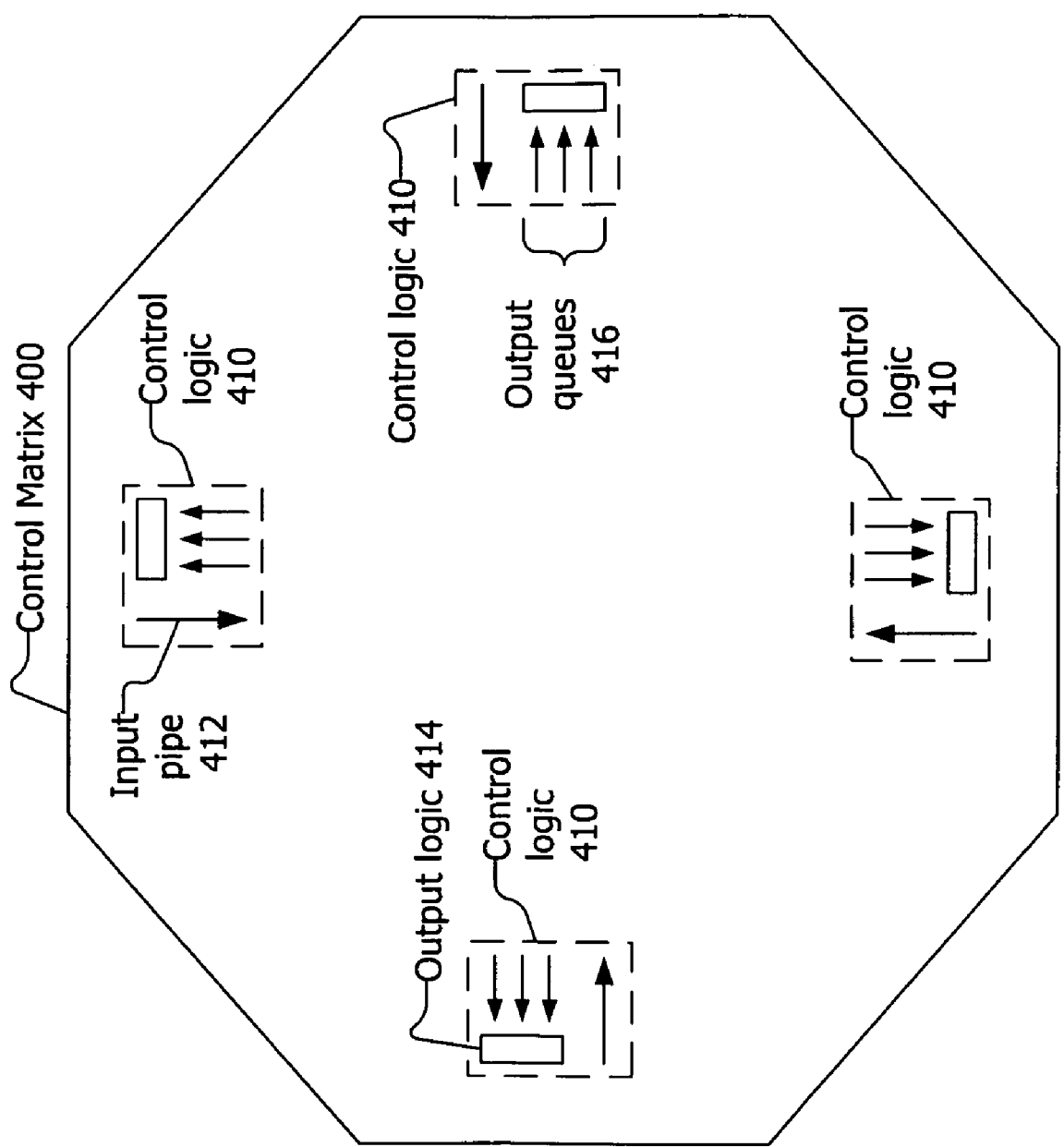
FIG. 4 is a block drawing illustrating the functionality of a control matrix described herein.

FIG. 4 is a block drawing illustrating the functionality of a control matrix 400 described herein. The control logic 410 included in control matrix 400 is shown to illustrate the functionality provided by the logic and circuitry included in the control matrix 320. The control matrix 400 does not have or include the control logic 410 shown, but it performs the functionality of the output logic 414, the input pipe 412, and the output queue 416. That is, the control matrix includes logic, circuitry and memory that perform the functionality of the input pipe 412, output logic 414 and output queues 416, but does necessarily include any these components.

Methods

Figure 5:
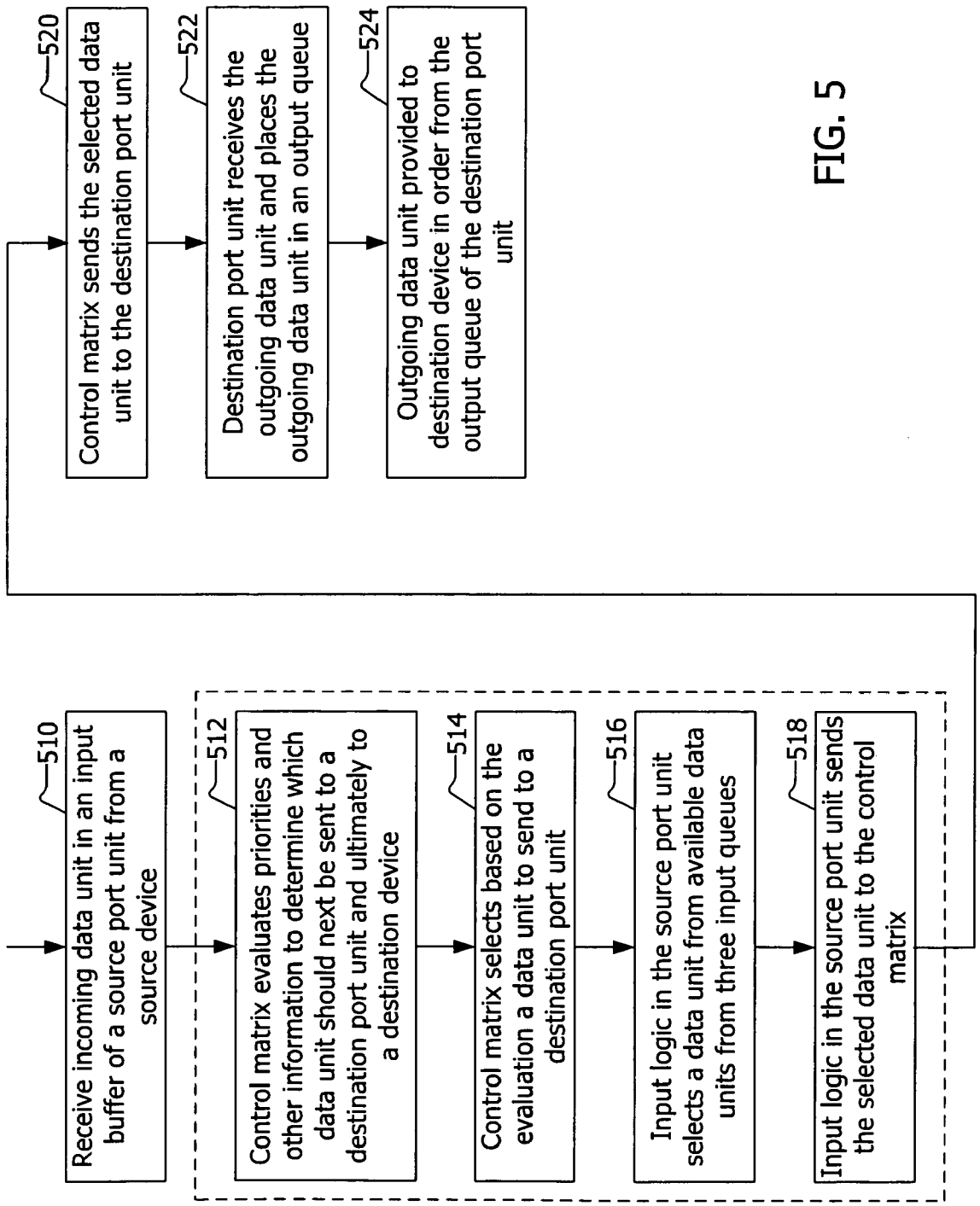
FIG. 5 is a flow chart showing the actions taken in a switch unit according to the invention described herein.

FIG. 5 is a flow chart showing the actions taken in a switch unit according to the invention described herein. The switch unit may be a switch unit like switch unit 300 shown in FIG. 4.

A port unit in the switch unit receives an incoming data unit in an input buffer of a source port unit from a source device, as shown in block 510. The source device may be any device, unit, component, or card coupled with the bus, such as by being plugged into the bus.

A sequence of four steps may be performed by the combination of the input logic of the source port unit and the control matrix working in cooperation. The four steps are steps 512, 514, 516 and 518. Step 1: The control matrix evaluates priorities and other information to determine which data unit should next be sent to a destination port unit and ultimately to a destination device, as shown in block 512. The evaluation is based on the rules and requirements of a bus standard such as the PCI Express bus standard and is in part based on information from input logic in the source port unit. The evaluation includes arbitration, prioritization, reordering, contention management, and other related functions. Step 2: The control matrix selects, based on the evaluation, a data unit to send to a destination port unit, as shown in block 514. Step 3: Input logic in the source port unit selects a data unit from available data units from three input queues based on instructions and/or information received from the control matrix, as shown in block 516. Step 4: Input logic in the source port unit sends or otherwise makes available selected data units to the control matrix, as shown in block 518. The input logic may conform to the PCI Express specification. The four steps may be collapsed into a single step, may be performed generally simultaneously or contemporaneously, or may be performed in an order different from that shown.

The control matrix sends the selected data unit to a destination port unit, as shown in block 520.

The destination port unit receives the outgoing data unit and places the outgoing data unit in an output queue, as shown in block 522. The outgoing data unit is provided to the destination device in order from the output queue of the destination port unit, as shown in block 524.

With regard to FIG. 5, additional and fewer steps may be taken, and the steps as shown may be combined or further refined to achieve the methods described herein.

Although exemplary embodiments of the invention have been shown and described, it will be apparent to those having ordinary skill in the art that a number of changes, modifications, or alterations to the invention as described herein may be made, none of which depart from the spirit of the invention. All such changes, modifications and alterations should therefore be seen as within the scope of the invention.

The invention claimed is:

1. A method comprising:
   receiving data units in the ingress portions of a plurality of port units
   a control matrix coupled to the port units performing prioritization, allocation, and virtual channel arbitration pursuant to a PCIE specification and setting a sequence in which the data units are sent to egress portions of the port units;
   transferring data units to the egress portions of the port units in accordance with the sequence set by the control matrix; and
   outputting data units from the egress portions of the port units,
   wherein the data units are not reordered after being transferred to the egress portions of the port units.

2. The method of claim 1, wherein
   the ingress portion of the each port unit includes an input queue, and
   receiving data units further comprises storing data units in the input queues of the plurality of port units.

3. The method of claim 2, wherein the input queue of each port unit includes a posted transaction queue, a non-posted transaction queue and a completion transaction queue.

4. The method of claim 1, further comprising:
the control matrix performing egress flow control and deadlock avoidance pursuant to the PCI Express specification.

5. A switch, comprising:
a plurality of port units, each port unit having an ingress portion including an input queue and an egress portion; and
a control matrix coupled between the plurality of port units, wherein the control matrix performs prioritization, allocation, and virtual channel arbitration pursuant to a PCI Express specification to determine the sequence in which data units are sent from the ingress portions of the port units to the egress portions of the port units, and
wherein data units are not reordered after being sent to the egress portions of the port units.

6. The switch of claim 5 wherein the input queue of each port unit includes a posted transaction queue, a non-posted transaction queue and a completion transaction queue.

7. The switch of claim 5 implemented on a single field programmable gate array.

8. The switch of claim 5 wherein at least two of the port units are coupled with respective devices.

9. The switch of claim 8 wherein each device is selected from the group comprising: a graphics card, a sound card, a network communications unit, a computer peripheral, a computer chip set, and a processor.

10. The switch of claim 5 wherein the control matrix further performs egress flow control and deadlock avoidance pursuant to the PCI Express specification.

* * * * *